United States Patent [19]

Berzina

[11] 4,239,428
[45] Dec. 16, 1980

[54] ROUTER ADJUSTMENT ATTACHMENT

[76] Inventor: James A. Berzina, 2812 W. Kingston Cir., Grand Island, Nebr. 68801

[21] Appl. No.: 42,604

[22] Filed: May 24, 1979

[51] Int. Cl.³ .............................................. B23C 1/20
[52] U.S. Cl. ................................ 409/182; 144/136 C; 408/110; 408/135; 409/185
[58] Field of Search ............... 409/181, 182, 185, 191; 144/134 D, 136 C; 408/110, 111, 112, 135

[56] References Cited
U.S. PATENT DOCUMENTS

| | | | |
|---|---|---|---|
| 1,584,078 | 5/1926 | Carter | 409/182 |
| 1,956,740 | 5/1934 | Gress | 408/111 X |
| 3,034,549 | 5/1962 | Quackenbush | 144/136 C X |
| 4,102,370 | 7/1978 | Vess | 144/134 D |

Primary Examiner—Z. R. Bilinsky
Attorney, Agent, or Firm—Clarence A. O'Brien; Harvey B. Jacobson

[57] ABSTRACT

A router assembly including a router sub-assembly vertically adjustable relative to a supportive base plate through the utilization of a sub-assembly supported rack gear and a pinion gear meshed with the rack gear and journaled from the base. The base includes a handle portion for horizontal directional control of the router assembly during routing operations and oscillatably supported from the base. Connecting structure operatively connects the handle portion and the pinion gear for oscillation of the latter in response to oscillation of the former, whereby adjustable oscillation of the handle will be effective to vertically adjust the router sub-assembly relative to the base plate.

6 Claims, 12 Drawing Figures

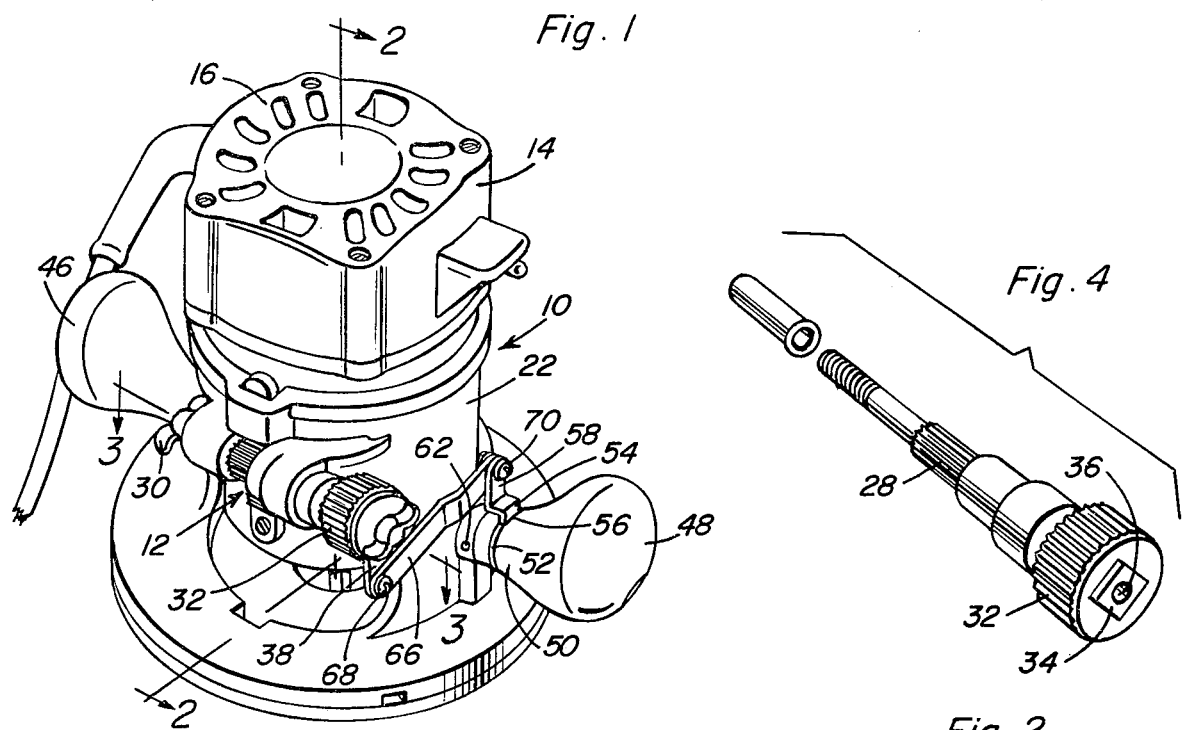
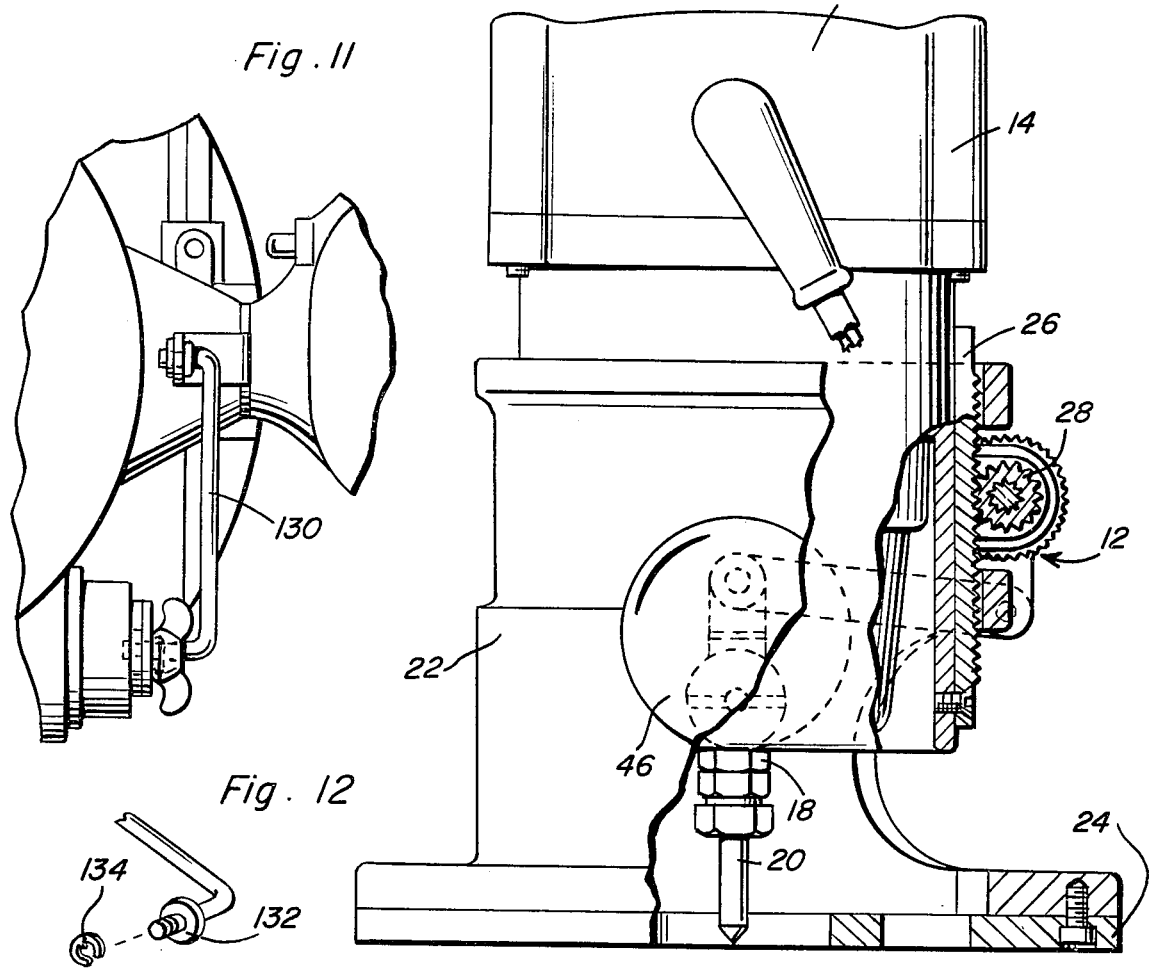

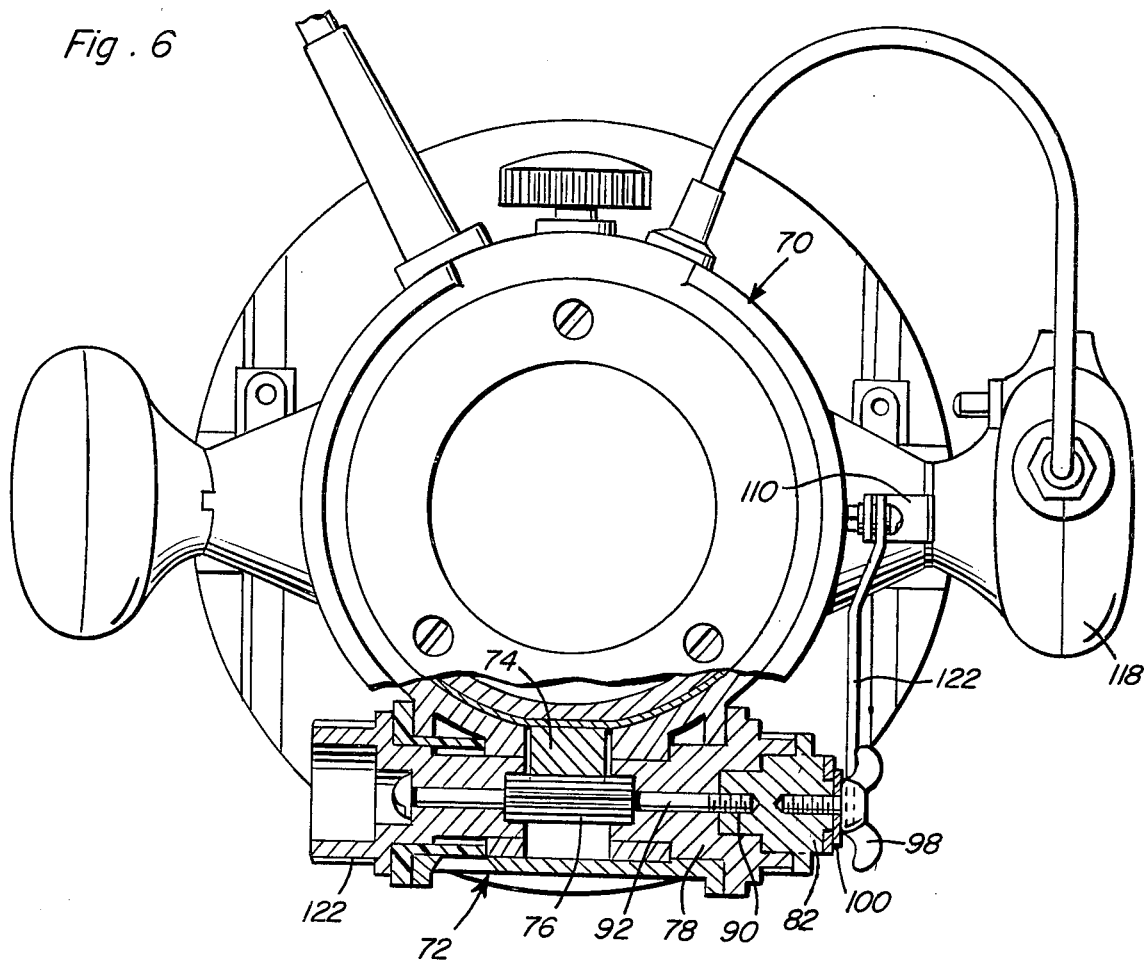
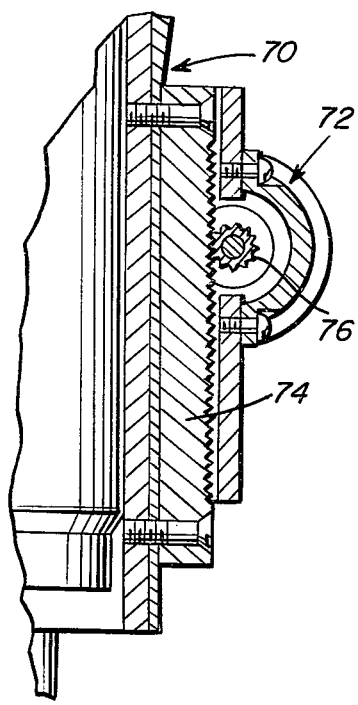
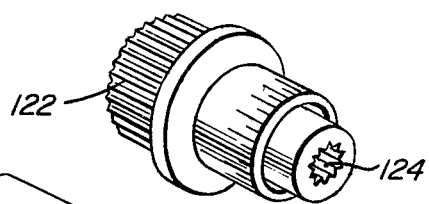
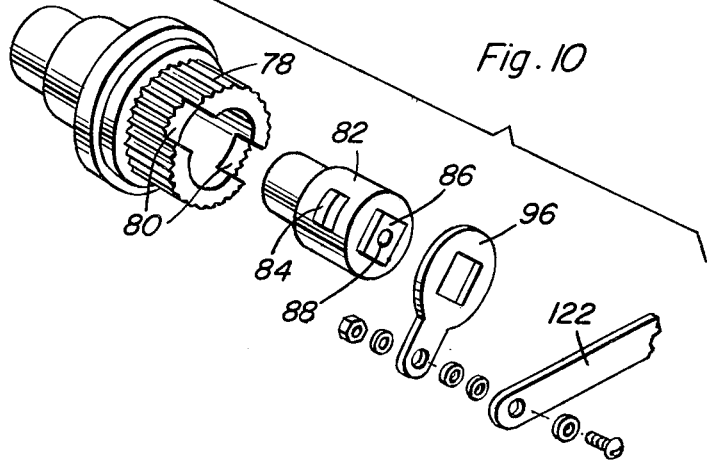

ROUTER ADJUSTMENT ATTACHMENT

BACKGROUND OF THE INVENTION

For the most part routers include adjustments for effecting vertical adjustment of the router sub-assembly relative to the base from which the sub-assembly is supported. However, these vertical adjustments may not be readily accomplished during use of the router and while guiding horizontal movement of the router with both hands. Accordingly, gradually varying depth routing in a controlled manner heretofore has not been possible when utilizing hand-held routers. Therefore, a need exists for structure whereby existing routers as well as newly constructed routers may have vertical adjustment structure incorporated therein enabling vertical adjustment of the router sub-assembly relative to the supportive base thereof while both hands of the operator of the router are holding the router handles.

Routers including conventional adjustment structures as well as other adjustable rotary equipment are disclosed in U.S. Pat. Nos. 2,855,963, 2,960,126, 3,160,133, 3,443,479 and 3,767,948.

BRIEF DESCRIPTION OF THE INVENTION

Most conventional router assemblies include a router sub-assembly comprising the router motor and a chuck mounted on the motor shaft, and a base plate relative to which the sub-assembly is vertically adjustable. The sub-assembly is conventionally provided with an upstanding rack gear and the base journals a pinion gear meshed with the rack gear. Accordingly, when it is desired to effect vertical adjustment with the sub-assembly relative to the base, a clamping structure is loosened and the pinion gear is turned to effect the desired adjustment.

The improvement of the instant invention resides in pivotally or oscillatably mounting of one of the base hand grips or knobs and providing an operative connection between one base hand grip or knob and the aforementioned pinion gear whereby the knob may be oscillated, while being used to control horizontal movement of the router, in order to effect gradual adjustment of the vertical height of the router sub-assembly relative to the base. By enabling such gradual adjustment, decorative cuts which vary in depth, and thus also in width (at least in some instances), may be made.

The main object of this invention is to provide a height adjustment for a router sub-assembly responsive to effect vertical adjustment of the sub-assembly relative to the supportive base therefor as a result of angular adjustment of a rotatably mounted hand grip or knob on the router base.

Another object of this invention, in accordance with the preceding object, is to provide an adjustment structure which may be readily incorporated into existing routers.

Yet another object of this invention is to provide a router subassembly adjustment structure which may also be readily incorporated into the manufacture of new routers.

A final object of this invention to be specifically enumerated herein is to provide a router assembly in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the first form of router incorporating the router height adjustment structure of the instant invention;

FIG. 2 is an enlarged fragmentary vertical sectional view taken substantially upon the plane indicated by the section line 2—2 of FIG. 1;

FIG. 4 is an exploded perspective view of a portion of the router adjustment structure;

FIG. 6 is a fragmentary horizontal sectional view similar to FIG. 3 but illustrating the second form of router;

FIG. 7 is an enlarged fragmentary vertical sectional view taken substantially upon the plane indicated by the sectional line 7—7 of FIG. 5;

FIG. 9 is a perspective view of a portion of the modified height adjustment structure of the second form of router;

FIG. 10 is an exploded perspective view of further portion of the height adjustment structure of the second form of router;

FIG. 11 is a fragmentary enlarged top plan view of another modified form of height adjustment structure; and FIG. 12 is a fragmentary perspective view of the connecting link portion of the adjustment structure illustrated in FIG. 11.

DETAILED DESCRIPTION OF THE INVENTION

Figure 3:
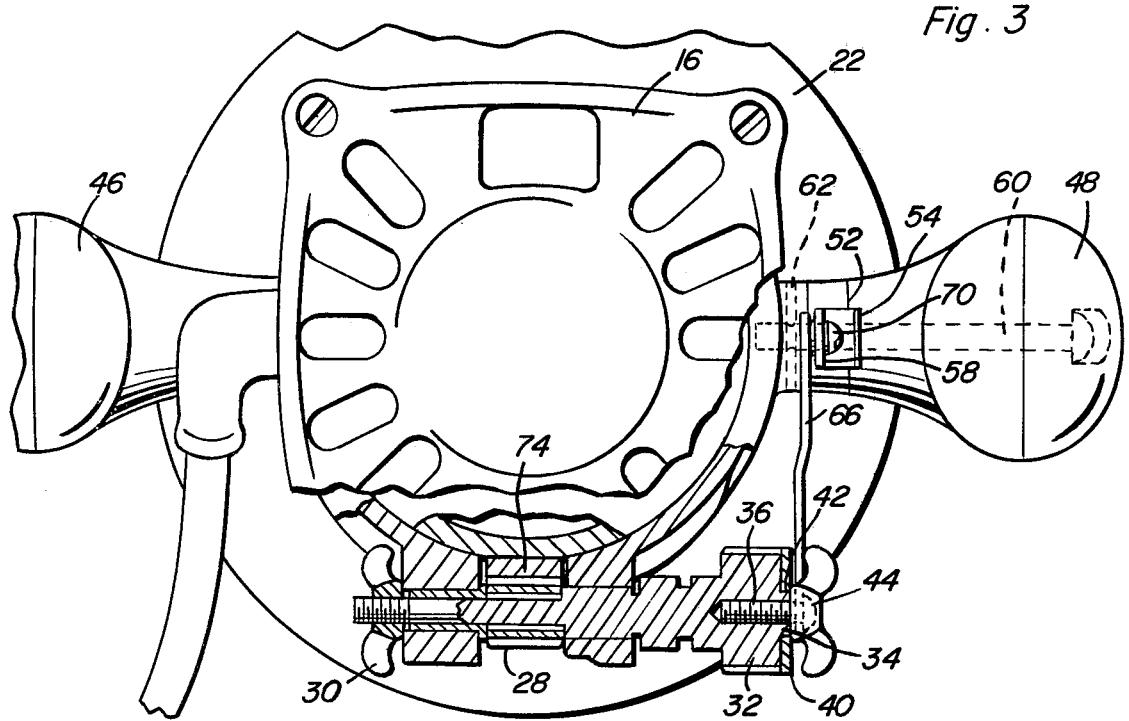
FIG. 3 is an enlarged fragmentary horizontal sectional view taken substantially upon the plane indicated by the section line 3—3 of FIG. 1.

Referring now more specifically to the drawings, a first form of router equipped with the height adjustment structure of the instant invention is illustrated in FIGS. 1-4 and is generally designated by the reference numeral 10. The router 10, as conventionally marketed, includes manual height adjustment structure referred to in general by the reference numeral 12 and substantially identical to that disclosed in U.S. Pat. No. 2,855,963, dated Apr. 19, 1957.

The router 10 includes a router sub-assembly consisting of the motor 16 and output shaft mounted chuck assembly 18 from which a router bit 20 is supported. In addition, the router 10 includes a base 22 in which the subassembly is vertically shiftable and the base 22 includes a base plate 24 removably secured to the underside thereof, which base plate 24 for adjustable depth routing, may be changed to a transparent base plate.

The height adjustment structure 12 conventionally includes a rack gear 26 supported from the sub-assembly 14 and a pinion gear 28 journaled from the base 22 and meshed with the rack gear 26. The wing nut 30 of the height adjustment structure 12 is loosened and the knob 32 is turned in order to cause the pinion gear 28 to rotate and thus the sub-assembly 14 to be vertically shifted relative to the base 22. However, with the instant invention, the outer end of the knob 32 is slightly machined to include a central square projection 34 and to be centrally blind bored as at 36. Thereafter, a lever arm 38 provided with an enlarged head 40 on its base end equipped with a central square aperture 42 is placed over the projection 34 and a wing nut equipped bolt 44 is threaded into the blind bore 36. In addition, the base, originally provided with a pair of opposite side handles or hand grips 46 and 48, has the hand grip 48 removed and the neck 50 thereof cut as at 52 into two pieces. Thereafter, the inner end of the outer portion of the cut hand grip 48 is hollowed out to a depth equivalent to the thickness of a second lever arm 54 and the periphery of the inner end of the outer portion of the cut hand grip 48 is radially notched as at 56 and also in a diametrically opposite location. The inner end of the lever arm 54 is enlarged and encludes a tab diametrically opposite the offset radially extending end 58 of the lever arm 54. The radially extending end 58 and the aforementioned tab are received in the radial notch 56 and the aforementioned diametrically opposite notch and the attaching bolt 60 for the hand grip 48 is reinstalled and held in adjusted position by a rolled pin 62 installed in a bore specifically provided therefor in the base 22.

An elongated connecting link 66 extends between and has its opposite ends pivotally attached to the free ends of the lever arms 38 and 54 as at 68 and 70. Thus, oscillation of the hand grip 48 (previously stationarily mounted on the base 22) is operative to effect oscillation of the knob 32 and thus vertical adjustment of the sub-assembly 14 relative to the base 22.

Referring now more specifically to FIGS. 6–10 of the drawings, there may be seen a modified form of router referred to in general by the reference numeral 70. The router 70 is, conventionally, substantially identical to that disclosed in U.S. Pat. No. 3,767,948, dated Oct. 23, 1973. The router 70 includes a height adjustment structure referred to in general by the reference numeral 72 similar to the height adjustment structure 12 including a rack gear 74 and a journaled pinion gear 76. However, the component 78 of the height adjustment structure 72 is machined to include diametrically opposite radial slots as at 80 and a plug 82 is provided for telescoping into the outer end of the component 78 and includes diametrically opposite gears 84 for reception for the notches 80. The outer end of the plug 82 includes a square projection 86 similar to the projection 34 and the outer end of the plug 82 is further provided with a threaded blind bore 88. Also, the inner end of the plug 82 is provided with a blind bore 90 into which the end of the bolt 92 of the height adjustment structure 72 remote from the head of the bolt 92 is threadedly engaged. A lever arm 96 corresponding to the lever arm 38 has its inner end telescoped over the projection 86 and a wing nut equipped bolt 98 is utilized in conjunction with a washer 100 in order to retain the lever arm 96 on the plug 82, the plug 82 being keyed to the component 78 and the lever arm 96 being keyed to the plug.

Figure 5:
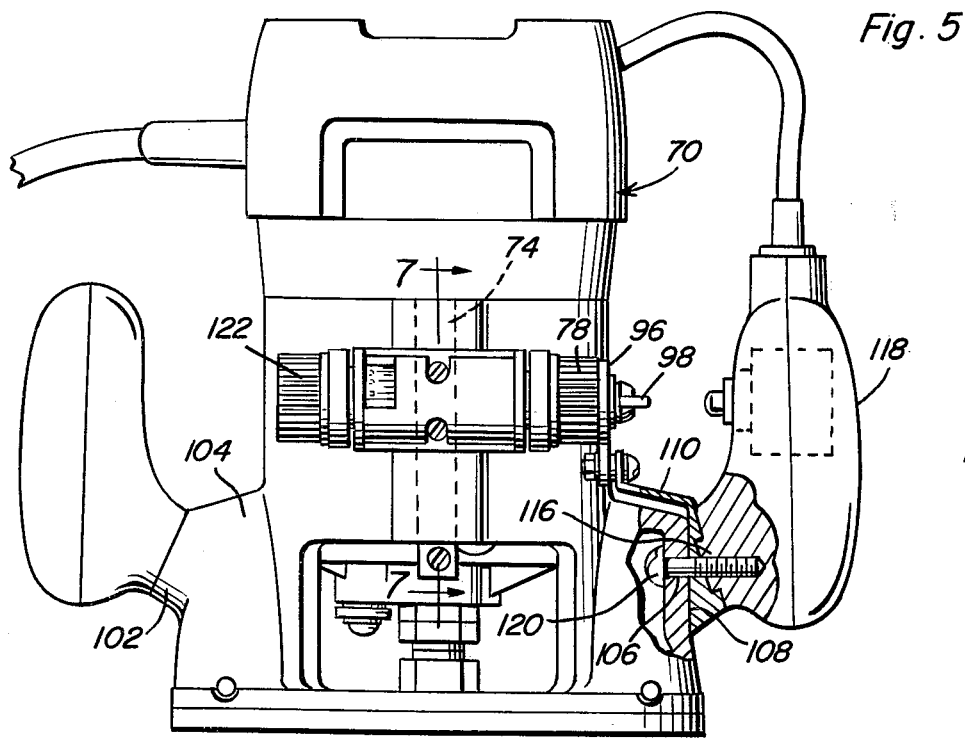
FIG. 5 is an enlarged rear elevational view of a second form of router incorporating a modified form of the height adjustment structure of the instant invention.
Figure 8:
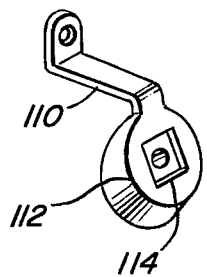
FIG. 8 is a perspective view of a portion of the handle or hand grip mounting structure included in the modified form of the invention.

With attention now invited more specifically to FIG. 5 of the drawings, there may be seen a mounting boss 102 on the left-hand side of the base 104 of the router 70. The comparable boss on the right-hand side of the base 104 is machined off and a horizontal bore 106 is provided in the base. Alternately, the original base 104 equipped with a pair of opposite side bosses 102 may be replaced by a base such as the base 104 having only one boss 102 thereon and a vertical mounting surface 108 on the side of the base 104 remote from the boss 102. A lever arm 110 corresponding to the lever arm 54 is provided, but the base end of the lever arm 110 is wedge-shaped as at 112 and provided with a square recess 114 in which to receive the square projection 116 on the handle or hand grip 118 corresponding to the hand grip 48. A mounting bolt 120 is utilized to secure the hand grip 118 to the wedge-shaped or tapered inner end of the lever arm 110 with the handle 18 keyed to the lever arm 110. Thereafter, a connecting link 122 corresponding to the connecting link 66 has its opposite ends connected to the free ends of the lever arms 96 and 110. Thus, it will be noted that the handle or hand grip 118 may be oscillated about the center axis of the bolt or fastener 20 in order to effect oscillation of the component 78 and thus the pinion gear 76. It will be noted that the height adjustment 72 includes a component 122 corresponding to the component 78. The adjacent ends of the components 122 and 78 including corresponding splined counter-bores 124 in which the opposite ends of the pinion gear 76 are keyed.

With attention now invited more specifically to FIGS. 11 and 12 of the drawings, a slightly modified height adjustment structure is illustrated. The height adjustment structure of FIGS. 11 and 12 is identical to the height adjustment structure 12, except that the height adjustment structure of FIGS. 11 and 12 includes a rod-type connecting link 130 corresponding to the connecting link 122. From FIG. 12 of the drawings, it may be seen that the opposite ends of the connecting links 130 include grooved angulated terminal end 132 with which C-shaped retaining washers 134 are removably engaged for releasably securing the angulated terminal ends 132 through the corresponding bores of the associated lever arms connected by the link 130. Otherwise, the height adjustment structure illustrated in FIGS. 11 and 12 is identical to the height adjustment structure 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination with a router assembly including a router sub-assembly vertically adjustable relative to a supportive base plate through the utilization of a sub-assembly supported rack gear and a pinion gear meshed with the rack gear and journaled from the base, said base including a handle portion for directional control of said router assembly during routing operations, means oscillatably supporting said handle portion from said base, connecting means operatively connecting said handle portion and pinion gear for oscillation of the latter in response to oscillation of the former, said connecting means including first and second lever arms operatively connected to said pinion gear and handle portion, respectively, for angular displacement therewith, and an elongated connecting link having its opposite ends pivotally connected to said lever arms.

2. The combination of claim 1 wherein the axis of rotation of the pinion gear and the axis of oscillation of said handle portion substantially parallel each other.

3. The combination of claim 1 wherein said elongated connecting link comprises a rod-type member having angulated opposite ends pivotally supported from said lever arms.

4. The combination of claim 1 wherein said connecting link comprises an elongated metal strip member whose opposite ends have transverse bore formed therethrough and are pivotally anchored relative to the corresponding lever arms by fasteners secured through said bores and said lever arms.

5. The combination of claim 4 wherein said second lever extends generally radially outwardly between axially spaced portions of said grip.

6. The combination of claim 4 wherein said second lever is keyed to one end face of said handle portion for oscillation therewith.

* * * * *